United States Patent
Trinh et al.

(10) Patent No.: US 7,509,374 B2
(45) Date of Patent: Mar. 24, 2009

(54) SYSTEMS AND METHODS FOR CREATING CUSTOMIZED APPLICATIONS

(75) Inventors: Peter L. Trinh, Fremont, CA (US); Mark L. Trinh, Fremont, CA (US); Bai Pham, San Francisco, CA (US)

(73) Assignee: Alchemic Solutions Group, Inc., San Mateo, CA (US)

( * ) Notice: Subject to any disclaimer, the term of this patent is extended or adjusted under 35 U.S.C. 154(b) by 259 days.

(21) Appl. No.: 11/222,916

(22) Filed: Sep. 9, 2005

(65) Prior Publication Data

US 2007/0061486 A1    Mar. 15, 2007

(51) Int. Cl.
G06F 15/16 (2006.01)
(52) U.S. Cl. .................... 709/203; 709/217; 709/246
(58) Field of Classification Search ................ 709/203, 709/246, 217; 715/744
See application file for complete search history.

(56) References Cited

U.S. PATENT DOCUMENTS

| | | | |
|---|---|---|---|
| 6,173,316 B1 | 1/2001 | De Boor et al. | |
| 6,317,781 B1 | 11/2001 | De Boor et al. | |
| 6,470,381 B2 | 10/2002 | De Boor et al. | |
| 6,589,291 B1 * | 7/2003 | Boag et al. | 715/513 |
| 6,670,968 B1 | 12/2003 | Schilit et al. | |
| 6,675,204 B2 | 1/2004 | De Boor et al. | |
| 6,685,608 B2 | 3/2005 | Hunter | |
| 6,874,018 B2 | 3/2005 | Wu | |
| 6,957,394 B1 * | 10/2005 | Fernandez et al. | 715/760 |
| 2002/0030844 A1 * | 3/2002 | Tuli | 358/1.15 |
| 2002/0116534 A1 * | 8/2002 | Teeple | 709/246 |
| 2004/0093376 A1 | 5/2004 | De Boor et al. | |
| 2004/0137891 A1 | 7/2004 | Clark et al. | |
| 2005/0014489 A1 | 1/2005 | Zhigang | |
| 2005/0097190 A1 * | 5/2005 | Abdelhak | 709/217 |
| 2005/0193053 A1 * | 9/2005 | Kendall et al. | 709/200 |

OTHER PUBLICATIONS

S. Callihan. Cascading Style Sheets by Example. Nov. 7, 2001. Excerpt from safaribooksonline.com. pp. 1-39.*
S. Callihan. Cascading Style Sheets by Example. Nov. 7, 2001. Additional Excerpt from safaribooksonline. pp. 40-49.*
WAP Architecture, "*Wireless Application Protocol Architecture Specification WAP-210WAP Arch-20010712*"; 2000-2001 Wireless Application Protocol Forum Ltd; Version 12-Jul. 2001.

* cited by examiner

*Primary Examiner*—Andrew Caldwell
*Assistant Examiner*—John M MacIlwinen
(74) *Attorney, Agent, or Firm*—Patent Law Group LLP

(57) ABSTRACT

A method of improving functionality of a client device comprises creating resource files for customizing content from one or more particular websites or third-party servers, storing the resource files on a customization server, downloading one or more of the resource files to the client device, downloading content from the particular websites or third-party servers, and rendering a rich user interface or application to interact with the website in accordance with the downloaded resource files. In some embodiments, the client device is a mobile device such as a handheld computer or a cellular telephone having a limited display area.

18 Claims, 10 Drawing Sheets

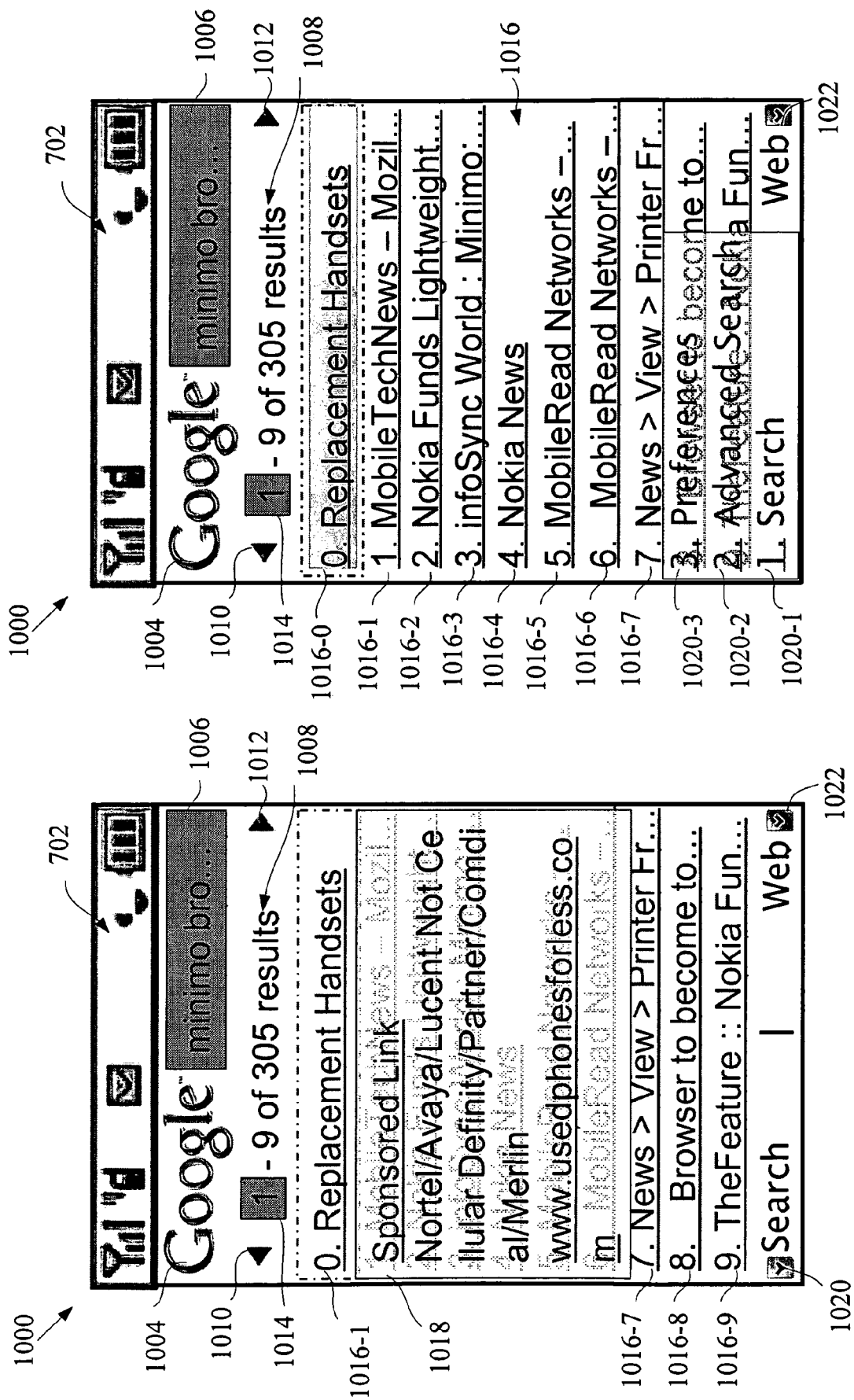

SYSTEMS AND METHODS FOR CREATING CUSTOMIZED APPLICATIONS

FIELD OF THE INVENTION

The present invention relates to client-server interactions over wide-area networks, and more particularly to systems and methods for retrieving content from a web server and customizing display and functionality of the content on a client device.

BACKGROUND OF THE INVENTION

Over the last two decades, the internet has grown from a discreet network of government laboratories and universities into a ubiquitous and essential tool for businesses, and an integral part of everyday life. Web sites, the building blocks of the internet, are growing at an exponential rate and have evolved from simply displaying information into interactive applications of seemingly limitless functionality. Many companies use web sites to offer services and conveniences to their customers, such as banks offering online web sites to check balances, pay bills, transfer money, etc. Other companies are entirely web-based, offering their products and services only through web sites, e.g., EBAY®, AMAZON. COM®, YAHOO!®, GOOGLE, etc.

On approximately the same timeline, mobile devices such as personal data assistants (PDA's), hand-held computers, and cellular telephones have proliferated and are now commonplace in both the business and consumer markets. In fact, in some countries, the average person may carry two or more mobile devices. Traditionally PDA's and cell phones served only very distinct and limited functions. PDA's were mini-computers used typically as organizers for storing contact and calendar information, taking notes, etc. Cellular telephones were simply just mobile telephones. Today, the functionality and features of such devices has merged and evolved, such that multi-function mobile devices are now capable of telephone communications, e-mail, web browsing, data management, and other mobile communications and computing functions. Yet, even with the convenience of being able to browse, or surf, the internet from such prolific and portable devices, the adoption of mobile devices as a viable tool to access the internet has been limited.

One primary reason for the limited adoption of mobile devices for internet communications relates to the relatively small viewing area of mobile device phone displays. The majority of the web sites available over the internet are designed to be displayed on a computer screen of 15 inches or more, and are not effectively displayed on a the limited screen of a cell phone, for example. Moreover, the interactive features of most web sites are designed for typical computer interfaces (e.g., display, mouse and keyboard). The rich content and interactive features of many websites, therefore, can be virtually unusable on mobile devices, which generally having screens of approximately 1.5 to 2 inches and a typical 11 key number pad, along with a few navigation soft keys.

Attempts to address this problem include advances in client browser software, which try to render web pages in an acceptable manner for the small viewing area of mobile devices. Computer algorithms have been developed to try to reformat and reorganize the contents of returned web pages to fit within the given screen display. However, such computer algorithms are not capable of optimizing the entire myriad of different web pages and content available over the internet, simply because of so much variation in the layout, content and features of existing websites.

On the server side, web site developers in some cases have created separate versions of their web pages specifically designed for viewing by mobile devices. For example, YAHOO!® has a YAHOO!® Mobile site that serves WML, a markup language similar to HTML, but specific for use by mobile devices. A typical WML page includes contents and features the may be very different from the regular web page, but is designed to fit within the small display areas on mobile phones. This approach is not widely used, however, and requires that the host maintains at least separate sets of web pages, e.g., one for regular desktop browsers and one for mobile device browsers. Such approaches also limit user interaction within the context of the web browser and user interface (UI) controls of the web page. They do not provide for customization of features and provisioning of interface controls to optimize usability and functionality of the page using a particular device.

Still another attempted approach for solving this problem includes creating profiles to help transform HTML and related code from web pages into some intermediary language or code to be displayed by a mobile device. Such profiles may include, for example, information about the size of the display area as well as color and language preferences. A computer algorithm then uses the profile information along with the source information to try to display an optimal view of the page on the mobile device.

However, because web pages have so much variation in content, layout, format, and functionality, the above approach has proven unsuccessful in solving the problem of effectively displaying and interacting with such ubiquitous web content using a mobile device. In particular, creating a generic computer algorithm capable of optimally or even adequately displaying any significant fraction of the large number of web pages available over the internet is simply not feasible.

Another limitation of existing approaches for navigating web sites using a cell phone or other mobile client is the problem of navigating pages and inputting text using the limited key pad of a cell phone. WML does allow the web page designer to specify short cut keys, or keys or buttons that bind to specific links within the web page. While some input technologies such as T9Word can help simplify text input by helping to auto-complete common words as a user begins to spell them, such technologies do not fully optimize a particular interface.

Thus there remains a need in the art for systems and methods for customizing and optimizing display and functionality of web sites and related content using mobile devices.

Discussion or citation of a reference herein will not be construed as an admission that such reference is prior art to the present invention.

SUMMARY OF INVENTION

The present invention addresses many of the shortcomings and drawbacks found in the prior art. For example, the present invention overcomes the various limitations of browsing on the internet using a handset by providing a system and method for a user, for example a web content developer, to easily create an application that is specific to interacting with a specific website for the handset.

In some embodiments, a method of improving functionality of a client device comprises creating resource files for customizing content from one or more particular websites or third-party servers, storing the resource files on a server, downloading one or more of the resource files by the client device, downloading content from the particular websites or third-party servers, and rendering a rich user interface or application to interact with the website in accordance with the downloaded resource files.

In some embodiments, the client device is a mobile device. In particular embodiments, the client device is a cellular telephone. Software instructions including content to be rendered on a client device and instructions for rendering the content can comprise one or more of a variety of code languages, for example, HTML, WML, XML, JAVA script, Visual Basic, C, C++, and/or combinations of languages or custom languages.

The present invention supports the de-coupling of existing web applications and the device-specific user interfaces to be developed for them. In some embodiments, the present invention provides support for "scraping" data from existing web applications for redisplay. This allows, for example, development of a device-tailored user interface for an existing web application with no modification to the existing application itself.

In preferred embodiments, the present invention makes use of XML and related standards, as well as an XML-based customization coding, to simplify porting to other platforms and integration with other browser applications. The present invention can also support the ease of maintaining device specific user interfaces, and in particular can maintain such interfaces even when a web application is changed.

In some embodiments, the present invention provides support for DHTML, or when servers serve different web pages with the same URL. DHTML, or dynamic HTML, can be described as a technique for developing interactive web sites using HTML, a client side scripting language (e.g. Java script) and CCS. Some embodiments of the systems and methods of the present invention can interact with websites that contain DHTML content.

In some embodiments, the present invention provides methods for generating custom applications that related device-specific events (e.g., depression of keys, buttons, and the like) to specific application functions, thereby allowing for native integration between a web application and target device.

In some embodiments, the present invention provides methods for generating a customized web application on a client device. Such methods can comprise (a) receiving on a client device, through a user interface of the client device, a command to retrieve website content from a website hosted on a first server, e.g., a web server; (b) routing a first request from the client device to a second server, e.g. a XDUML server, or customization server, wherein the second server includes a memory storing customization code including one or more instructions for customizing features of the website for use on the client device; (c) receiving from the second server the customization code; (d) sending a second request to the first server for the website content; (e) receiving the website content; (f) customizing the website content in accordance with the one or more instructions in the customization code, thereby constructing the customized web application; and (g) operating the customized web application through the user interface of the client device.

In some embodiments the client device includes a number of widgets, which may define, for example, certain features or feature sets that may be called upon by the customization code received from the XDUML server and employed in a corresponding customized application generated on the client device. Some examples of widgets include menus, tables, buttons, checkboxes, arrows, lists, graphics, and other features that may be included in a customized application. The customization code can be XML-based and can include, for example, coded instructions identifying widgets that are to be used in a customized application and how they are to be used, instructions for laying out such widgets, and instructions for mapping corresponding web content received from the web server onto the user interface of the client device.

The present invention can be applied to work with browsers on desktop or laptop computers as well as mobile devices such as cell phones, handheld computers, tablet computers, and personal data assistants. In certain embodiments, the systems and methods of the present invention are applied to client devices having small display areas. In still other embodiments, the present invention applies to client devices having large displays, but where only a portion of the display is to be used for a particular application, e.g. a web browser or e-mail client, or where specific features of the client device are to be provisioned for customized interaction with a web page.

BRIEF DESCRIPTION OF THE DRAWINGS

The invention and further developments of the invention are explained in even greater detail in the following exemplary drawings. The present invention can be better understood by reference to the following drawings, wherein like references numerals represent like elements. The drawings are merely exemplary to illustrate certain features that may be used singularly or in combination with other features and the present invention should not be limited to the embodiments shown.

FIGS. 10A and 10B are additional illustrations of the improve interface of FIGS. 9A and 9B, depicting additional features and functions of the web site.

Like reference numerals refer to corresponding parts throughout the several views of the drawings.

DETAILED DESCRIPTION

Figure 1:
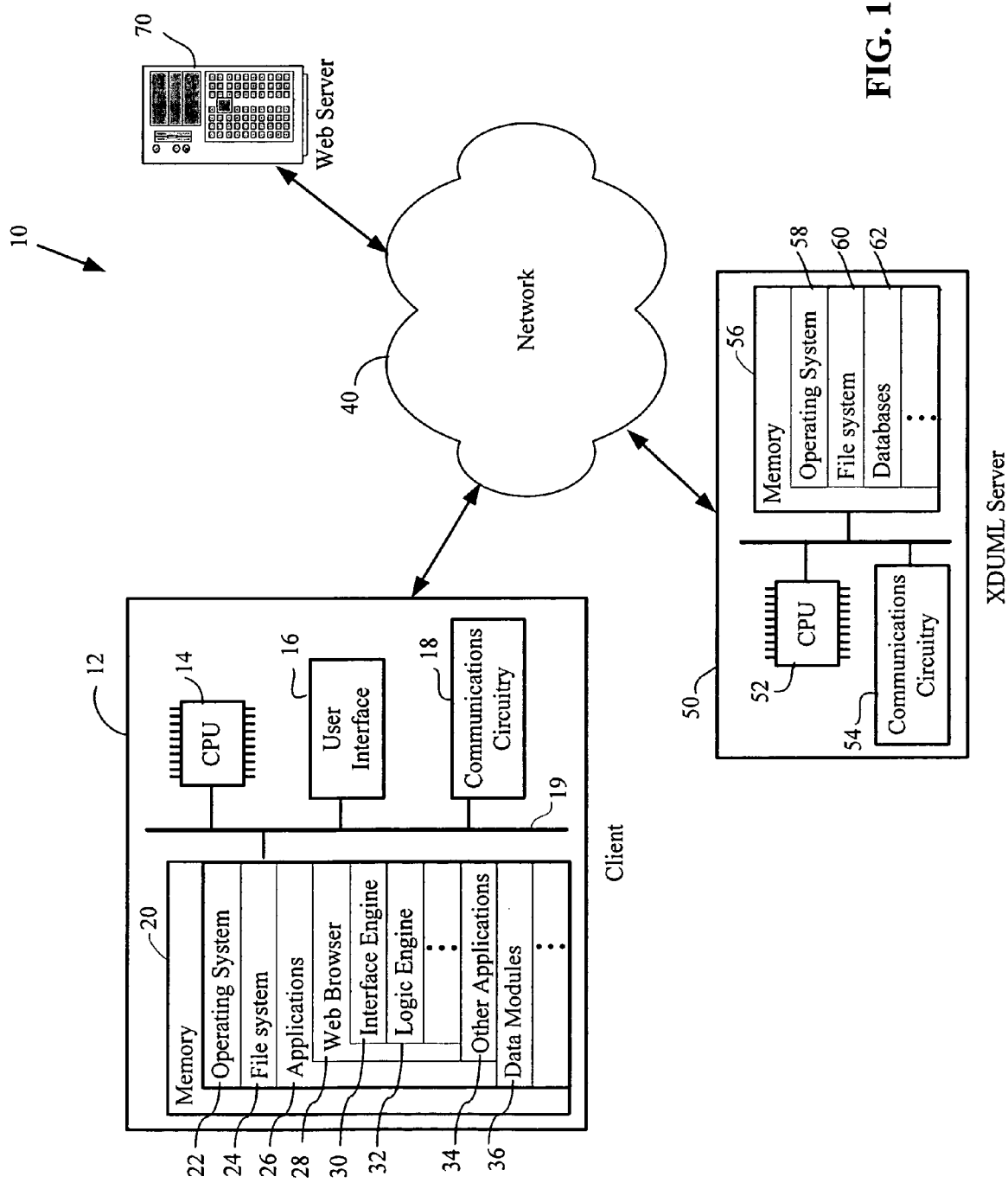
FIG. 1 is a schematic diagram of a system for delivering customized web pages to a client device according to the present invention.

FIG. 1 details an exemplary system 10 that supports the functionality described above and detailed in sections below. System 10 comprises a client 12 in communication over a network 40 with a server 50, also referred to herein as XDUML server 50, and one or more web servers 70. Client 12 can be any processor-based client device capable of communicating over a network, for example a personal computer, a network terminal, a laptop computer, a handheld computer, a PDA, a cellular telephone, and the like. In preferred embodiments, client is a computer or mobile device configured for browsing web pages and other content over the internet.

Exemplary client 12 can comprise a central processing unit 14, a user interface 16, communications circuitry 18, a memory 20, and a bus 19. Memory 20 can comprise volatile and non-volatile storage units, for example hard disk drives, random-access memory (RAM), read-only memory (ROM), flash memory and the like. In preferred embodiments, memory 20 comprises high-speed RAM for storing system control programs, data, and application programs, comprising programs and data loaded from non-volatile storage. User interface 16 preferably comprises one or more input devices, e.g., keyboard, key pad, buttons, soft keys, wheels, and the like, and a display or other output device. A network interface card or other communication circuitry 18 provides for connection to any wired or wireless communication network 40, which may include the internet and/or any other wide area network, and in particular embodiments comprises a mobile telephone network. Internal bus 19 provides for interconnection of the aforementioned elements of client device 12.

Operation of client 12 is controlled primarily by operating system 22, which is executed by central processing unit 14. Operating system 22 can be stored in system memory 20. In addition to operating system 22, in a typical implementation system memory 20 may include one or more of the following:
 file system 24 for controlling access to the various files and data structures used by the present invention;
 an applications module 26, including a web browser 28 for interacting with servers 70 over the internet 40, for example using the Internet Protocol ("IP") communications protocol, as well as other applications 34, which may include, for example, address book or calendar applications, games, word processing, e-mail, and applications related to telephone features and various other features of client device 12; and
 an interface engine 30 and a logic engine 32, which may be associated with web browser 28, for customized interaction with web pages as described in more detail herein.

In some embodiments, each of the aforementioned data structures stored or accessible to system 12 are single data structures. In other embodiments, such data structures, in fact, comprise a plurality of data structures (e.g., databases, files, archives) that may or may not all be stored on client 12. For example, in some embodiments, data modules 36 comprise a plurality of structured and/or unstructured data records that are stored either on computer 12 and/or on computers that are addressable by computer 12 across the network 40.

Server 50 can also be a processor based computer system, comprising a CPU, communications circuitry 54 and a memory 56 having similar features and functions as described above with respect to client 12. Memory 56 can comprise volatile and non-volatile memory, and can include an operating system 58 a file system 60, databases 62, and various other application modules, data modules, data structures, and the like. Various other aspects, details and functions of server 50 are described in sections below.

Figure 7:
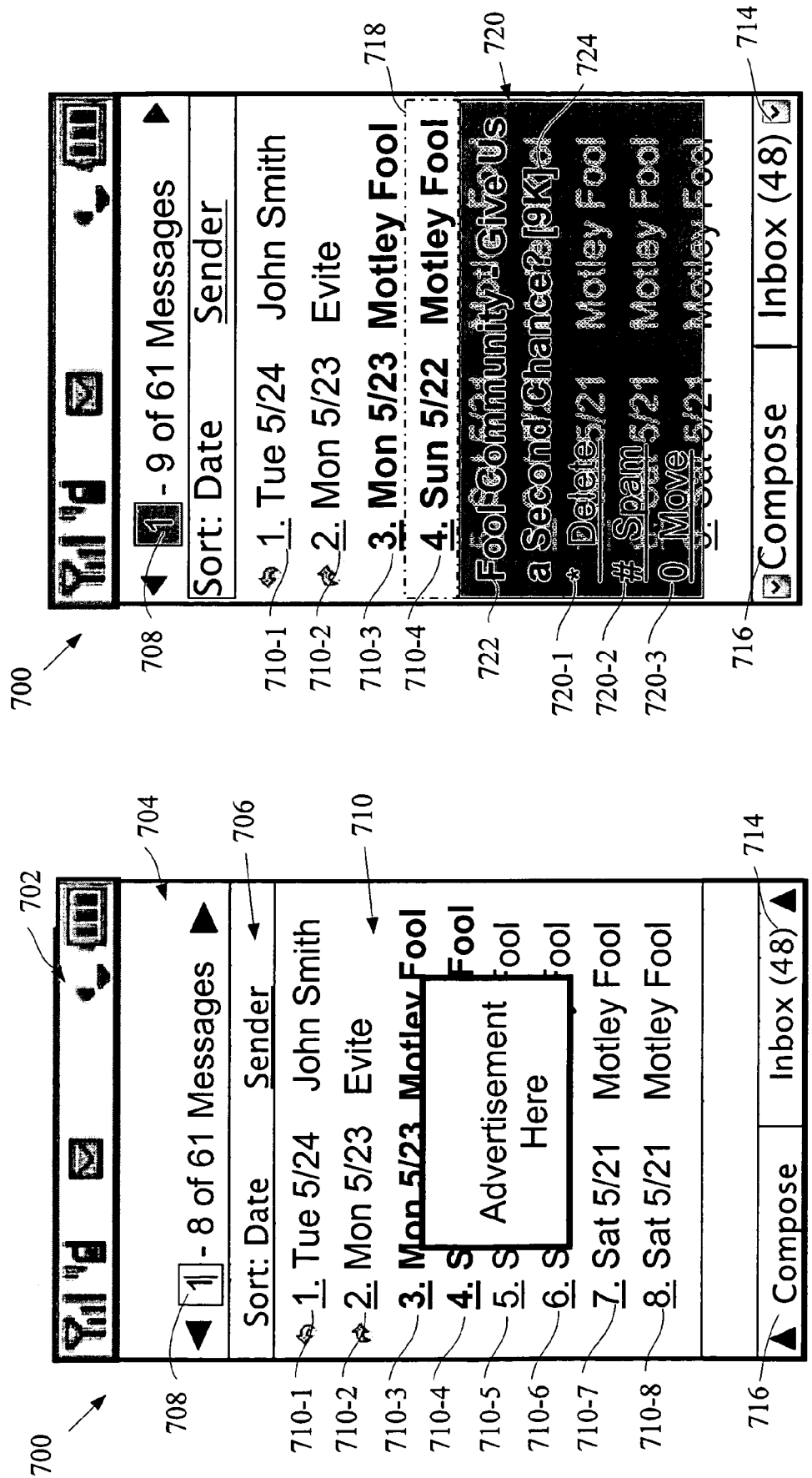
FIGS. 7A and 7B are illustrations of an improved user interface for a web mail application according to an embodiment of the present invention.

In particular embodiments, databases 62 of server 50 can include data modules that include customization code that specifically may or may not be for the various web sites and/or the various devices that are supported by system 10. For example, one particular set of customization code is used to generate a customized e-mail application as shown and described with respect to FIGS. 7A and 7B (YAHOO!®

Mail), while a different set of customization code may be used to generate the customized search application of FIGS. 9A-10B. Moreover, customized display of different websites of the same type, e.g. web mail sites such as YAHOO® Mail and MSN HOTMAIL®, may require different sets of customization code on server 50 designed particularly for that site. Similarly, server 50 can include specific sets of customization code tailored for specific types, brands or models of client devices.

Web server 70 can be any server computer connected with the internet or network 40 and hosting web pages and/or other content that may be accessible by web browser 28. One skilled in the art will appreciate that, while only one web server 70 is shown for convenience, the present invention comprises a system for communicating with a large number of distributed servers connected with the internet 40.

As discussed in sections above, the present invention is particularly useful for optimizing display and interaction with web pages and other content stored on servers 70 over the internet 40. In some embodiments, client device 12 is configured to browse web pages stored on servers connected to the internet in a typical manner that is known and used in the art. For example, a user interacts with a web browser 28 or other application on client device 12, which may be a mobile device, cell phone, desktop device, or any other device, e.g. by clicking on a web link or inputting a uniform resource locator ("URL"), or address, using an input feature of user interface 16. The web browser 28 will send an HTTP request over the internet 40 to the web site designated by the URL. A web server 70 receives the HTTP request, processes the request, and returns HTML code over the internet 40 back to the web browser 28 on client 12. Web browser 28 and/or related applications on client 12 then renders the HTML code on a display of the user interface 16. The user can then interact with the displayed content, and the process repeats.

The above general process describes basic interactions with web pages as is generally known in the art. Embodiments of the present invention include additional features and aspects that provide customized display of web page information on client devices 12 using specialized configuration code, e.g., referred to herein as customization code, an example of which is XDUML code, from server 50. Such customization code is used by browser 28 to customize layout, mapping and functionality of particular web sites optimized for that client device 12.

Figure 2:
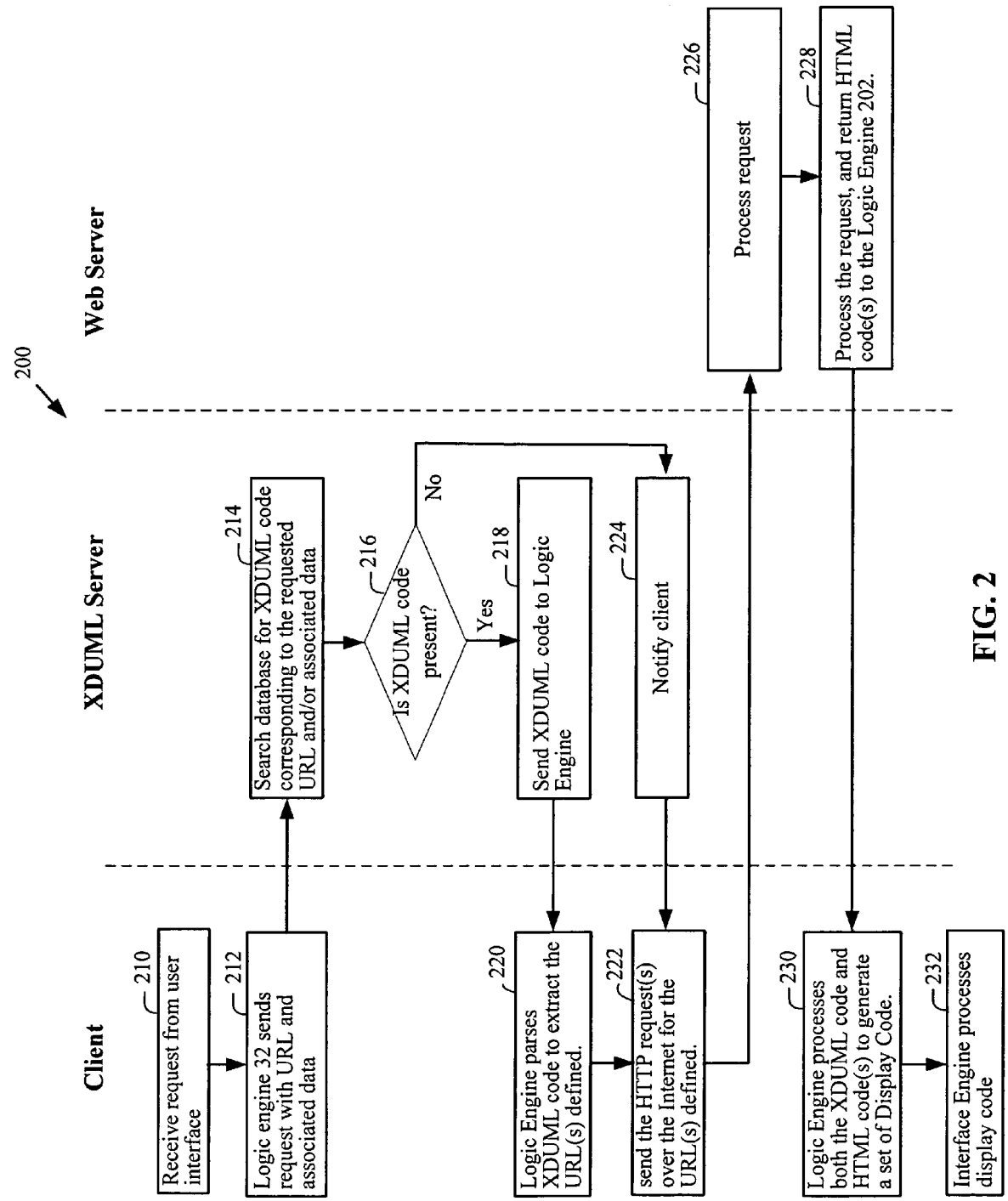
FIG. 2 is a flow chart illustrating a method of delivering customized web pages to a client device using the system of FIG. 1.

Referring now to FIG. 2, there is shown an exemplary method 200 for customizing display and functionality of web content on a client device 12 according to an embodiment of the present invention. First, in step 210 a user interacts with user interface 16 and web browser 28 to request a web page as in the example described above. However, in the present example, before web browser 28 sends out an HTTP request for a URL, logic engine 32 sends a request containing information about the URL to browse, as well as any other available data associated with the URL (e.g., cookies or other identifiers or personalized information), to the server 50 in step 212. The server 50 in 214 searches its database for customization code corresponding to the requested URL, cookie and/or other associated data. If such customization code is found 216, the server 50 sends 218 the code back to the logic engine 32. Logic engine 32 then parses 220 the customization code to extract the URL(s) defined and sends 222 the HTTP request(s) over the Internet 40 for the URL(s) defined.

If, in step 216, there is no customization code on the server for the corresponding URL/HTTP request, then the logic engine is notified 224, e.g., by a message or other signal from the server 50 that there is no customization code, and the remaining steps 222, 226, 228, 230 and 232 proceed as described in the general web browser example above.

In step 226, one or more web servers 70 receive the HTTP request(s) 226. Server 70 then processes the request and returns corresponding HTML code(s) back over the network 40 to logic engine 32 in step 228. If the requested URL(s) have no dependencies upon each other, the logic engine 32 may send all the requests at once. For example, in one embodiment of a customized web mail client according the present invention (e.g., as shown and described below with respect to FIG. 7B), data from multiple URLs are retrieved in order to store and display previews of e-mails on a client device. Such previews can be dependent upon the list of messages in an inbox, for example, and can be requested by the logic engine 32 after retrieving and parsing the contents of the inbox. The customization code can include instructions for identifying such dependencies and, if present, then logic engine 32 can send one or more requests in an order defined by the corresponding customization code.

After receiving all the required HTML code, logic engine 32 then processes 230 any corresponding customization code along with the HTML code(s) to generate a set of display code. The display code can then be processed by the interface engine 30 in step 232 to generate a customized application having rich content and greater functionality than the corresponding web page(s) defined by the HTML code, thereby creating the "look and feel" of a rich, native-looking, client-based application with which the user can interact using interface 16. Some examples of such "native looking" applications include customized web mail applications and web search applications as described in more detail with respect to FIGS. 6 to 10B.

When the user interacts with the new application, interface engine 30, if needed, works in conjunction with logic engine 32 to retrieve further data from web server 70, or other web servers, and server 50, and to provide the data for the new application. For example, from the perspective of a user, he or she simply interacts with the new customized application as if it were a native application on the device, even though with each click, key stroke or other input function the logic engine 32 may invoke a request, e.g. and HTTP request, to fetch additional HTML or other code in the background from one or more specified URLs.

If in step 216 there is no customization code on the server for the new corresponding URL/HTTP request, then the logic engine is notified 224 and the interface engine 30 will simply revert back to the web browser mode and display the HTML code within the web browser interface until a URL is requested with a corresponding customization code.

Figure 3:
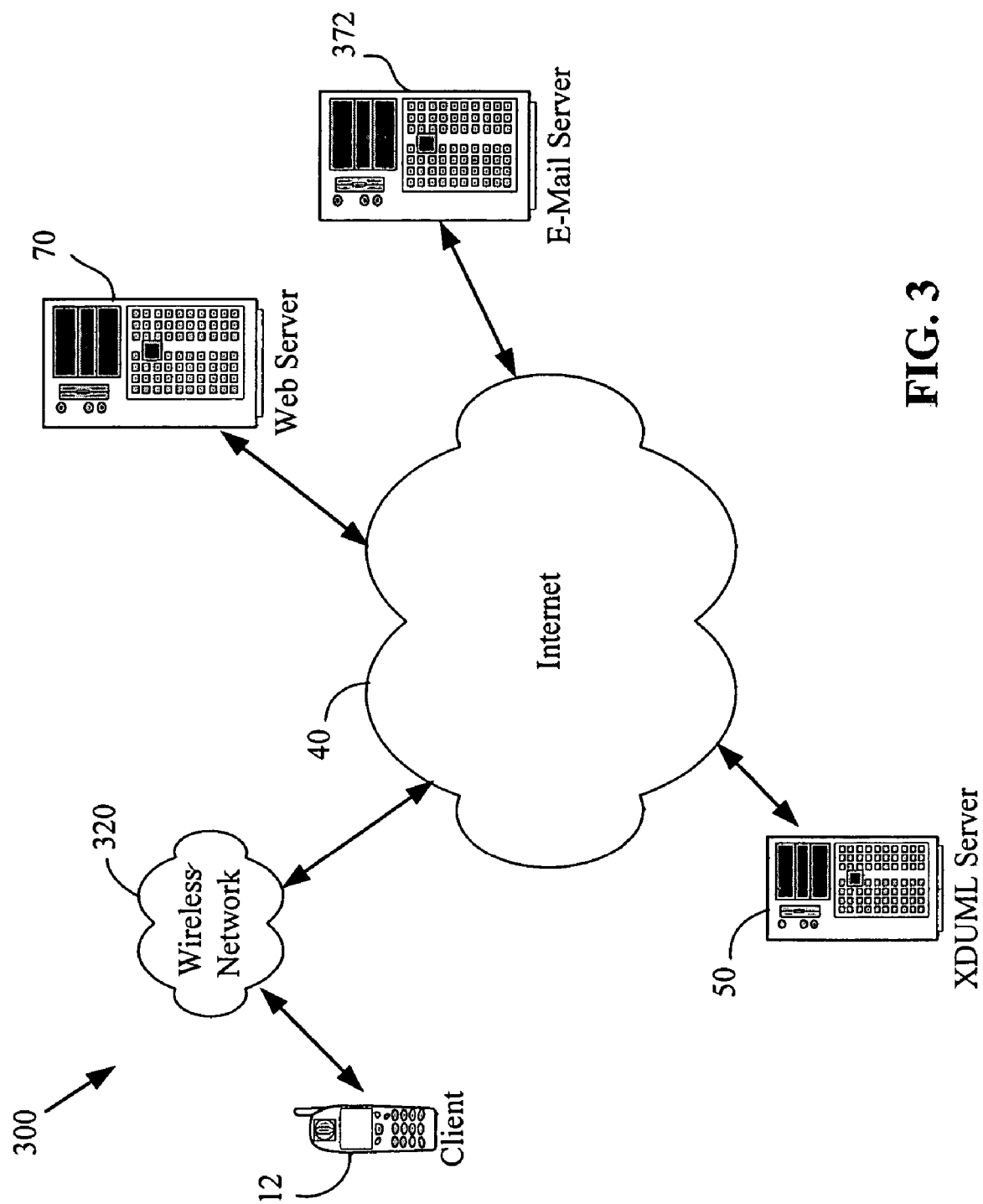
FIG. 3 is a schematic diagram of a system of a particular embodiment of the system of FIG. 1, where the client is a mobile device.

Referring now to FIG. 3, a system 300 is a particular embodiment of system 10 of FIG. 1, wherein client 12 is depicted as a mobile device, e.g., cellular telephone. Mobile device 12 communicates with the internet 40 via a wireless network 320, for example any cellular telephone network such as a GPRS network, a PCS network, a satellite network, or any other local or wide area communications network. In addition to one or more web servers 70 and server 50, other servers or devices such as an e-mail server 372 may be connected and communicating with mobile device. In one embodiment, data server 70 provides e-mail messaging content and functions that may be utilized by client 12 and incorporated with other information, e.g., web page information, to create customized displays, pages and features as discussed in sections below.

Figure 4:
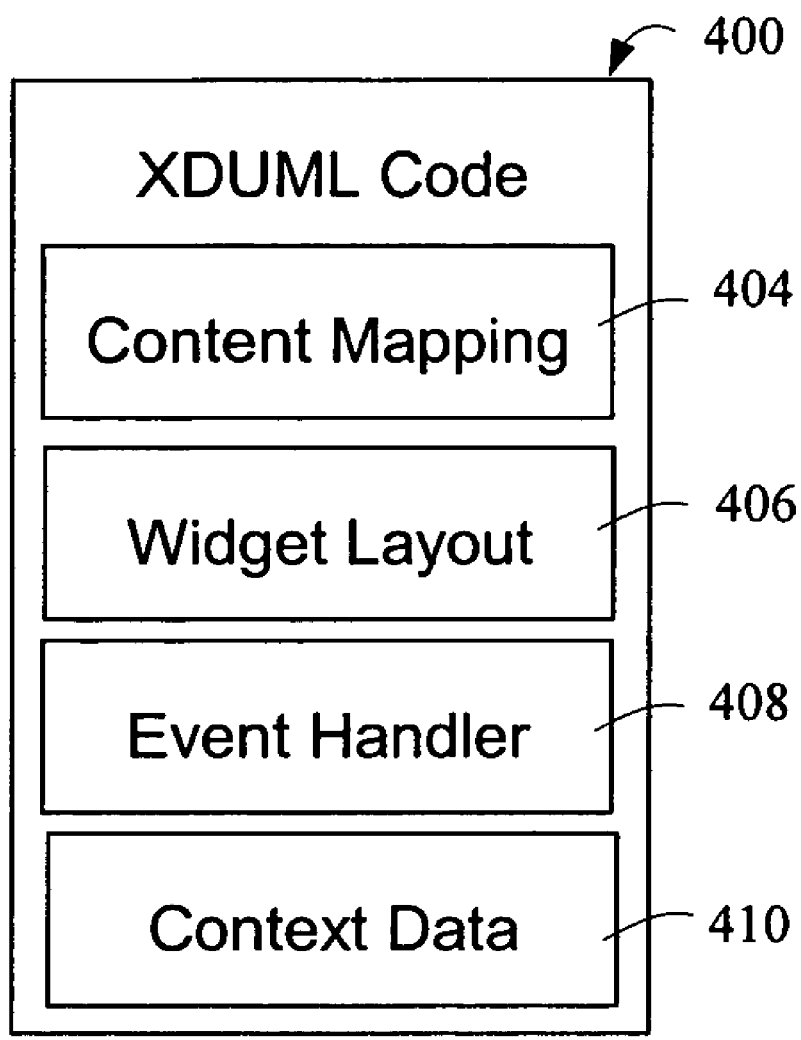
FIG. 4 is a schematic diagram illustrating exemplary components of a customization code according to an embodiment of the present invention.

Referring now to FIG. 4, a block diagram illustrates some components of a customization code 400 (e.g., a code sent from server 50 to logic engine 32 in system 10 described above), according to an embodiment of the present invention. In some embodiments, customization code 400 comprises an XML Device Usability Markup Language (XDUML), including XML-based instructions and support scripting, e.g. JavaScript, that allow flexible specification of features. Customization code 400 defines the application interface as well as behavior and functionality based upon the web site data. According to one embodiment of the invention, customization code 400 comprises four components: content mapping 404, widget layout 406, event handler 408 and context data 410, each of which is described in more detail below.

Content mapping component 404 specifies the various content that client 12 is to retrieve in order to customize the requested web site or page. Such content may be different than the content specified by the original HTTP request by the user, and may include information from multiple web pages and/or URLs to be combined into a customized application for display by client 12. Content mapping component 404 can comprise specifications, e.g., XPATH specifications or the like, which specify where to locate the content information for the custom application. The XPATH portion of the content mapping component 404 will specify the URLs needed to obtain the content, as well as where in the resulting HTML documents the information should be obtained (e.g., scraped). As suggested above, one or more URLs can be specified by the XPATH portion, thereby allowing applications to be developed that can display information from multiple HTML documents and enabling more flexibility in designing the device-specific user interfaces. XPATH specifies a certain location in an XML DOM tree, and therefore requires that the HTML be valid XML (i.e. valid XHTML), which is not always the case; however one skilled in the art will appreciate that there are existing tools that can convert HTML into valid XML. The contents pointed to by the XPATH will then be bound to a variable for use in the widget layout 406 portion of the customization code 400.

Widget layout component 406 can specify the user interface layout along with what widgets are to be displayed. Widgets are user interface components, e.g., check boxes, buttons, or other features that may be incorporated into the customized user interface application. An example illustrating features of sample code that may be used according to the present invention is provided below in the section entitled "Example".

Event handler component 408 defines the action to take when the user of the handset presses a key. In some embodiments, event handler 408 comprises JavaScript code to register and handle specific device events for the application. These handlers in turn depend upon event mappings and services provided by the interface engine 30 of web browser 28, where they can be implemented as drivers, resource files, etc. Such approach can enable tighter integration with the device, allowing the customized application to act like a "native" application on the device. This can be accomplished, for example, by having interface engine 30 mediate between the native graphical user interface (GUI) toolkits and the customized application developer. The interface engine 30 drivers translate device key and buttons input into internal events of the present system 10. These events and other interfaces can be published to the application developers.

For example, suppose one wanted a particular action to occur when a user pressed the "#" key on a cell phone. A code fragment for the event handler component 408 might look like this:

```
<EVENT control="mynewUIButton" type="Phone_Key_#"
script="javascript">
        var text = myTextControl.getValue ( );
        screen.display (text);
</EVENT>
```

In this example, Phone_Key_# would get translated to the correct device ID for the particular cell phone, e.g., by the interface engine 30 at runtime. When the cell phone user presses the # key on the widget "mynewUIButton", the JavaScript code within the EVENT XML tags will be executed.

The context data component 410 comprises URL specific data that would aid in the interaction with the web site. Among other data, the context data 410 can include a dictionary of the most commonly used words for a given web site. Context data 410 can also supply a different set of dictionaries specific to the widget that a user is currently interacting with. This could aid the T9Word technology, for example, to more accurately predict and complete the word that the user is trying to type on the handset keys. For example, if the current input field requires a URL, then words www., .com, .net, etc. would be in the dictionary for that field. However, if the current input field requires key words to do a search, and the most commonly searched word for the week was "Food", then "Food" would be in the dictionary for that input field. In another embodiment according to the present invention, a text input application uses recent events and tracks and ranks common search words and parameters related to such events. For example, if there has been a recent earthquake in California and a lot of recent queries in GOOGLE™ have included the words "earthquake" and "California", then when the web browser on a cell phone browses GOOGLE™, the words earthquake and California should have a correspondingly higher priority when using the T9Word text input.

Figure 5:
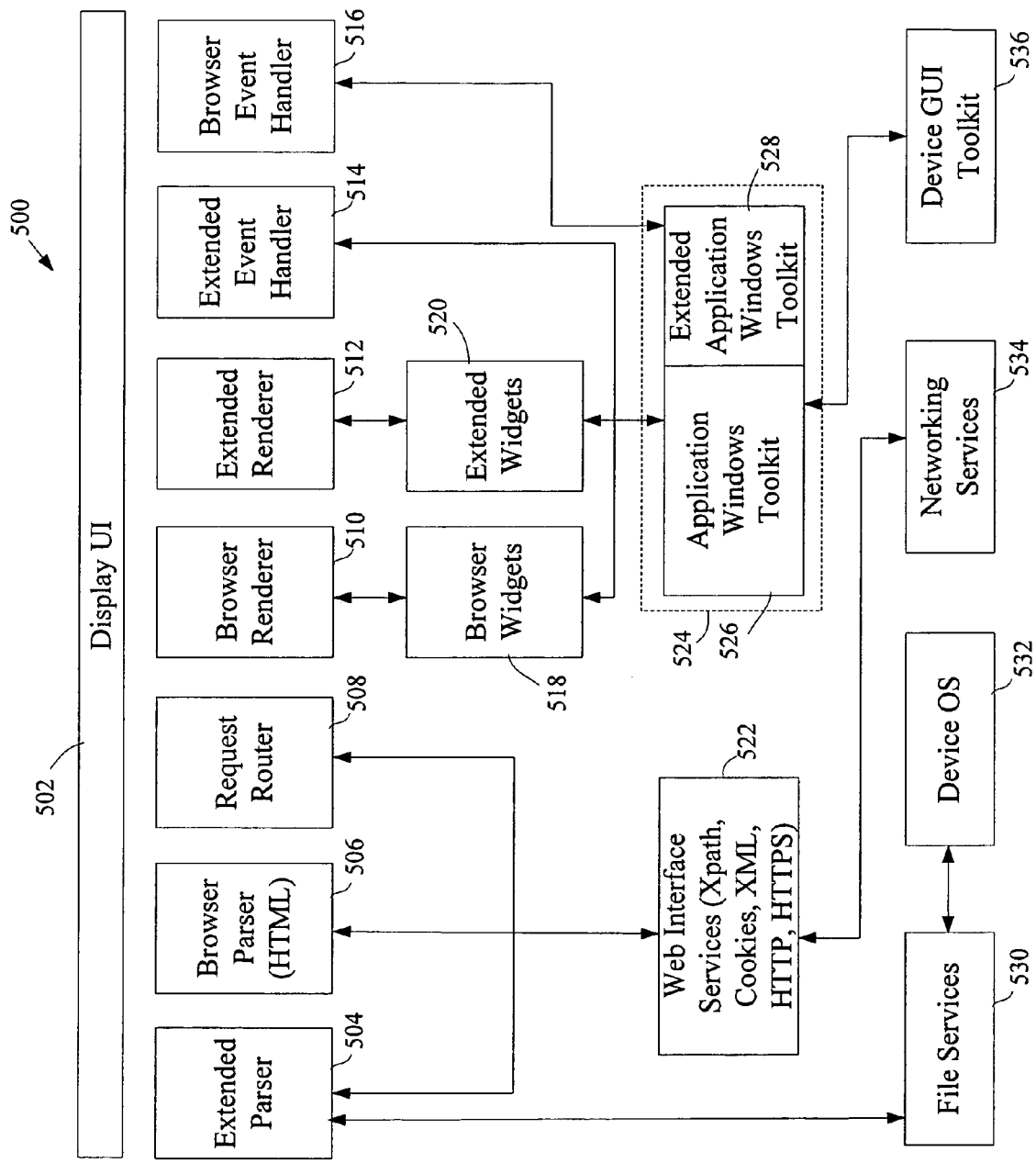
FIG. 5 is a schematic diagram illustrating components of a client according to an embodiment of the present invention.

FIG. 5 illustrates the component structure of a system architecture of a device 500 according to an embodiment of the present invention. Device 500 can be a client device such as client 12, and may be a cellular telephone or other mobile device, a personal computer, or other devices as described above with respect to client 12. Display UI 502 interacts with the user, displaying either a standard browser view using Browser Renderer 510 or an enhanced user-friendly view using the Extended Renderer 512.

If the regular browser view is being displayed, then user interaction with the Display UI 502 will be sent to Browser Event Handler 516. If the invention's enhanced view is being displayed, then user interaction will be sent to Extended Event Handler 514.

When the user enters a text or clicks a link in the Display UI 502 which results in a URL requests, the Request Router 508 will query the XDUML Server 50 for the customization code 400.

The Browser Parser 506 will parse the HTML data received from the said URL requests to build the DOM (Document Object Model) render tree, a data structure used by the Browser Renderer 510. If there is customization code 400 present, the Extended Parser 504 will parse the customization code 400 (XML Device Usability Markup Language) and JavaScript syntax to build a render tree, an intermediate data structure used by the Extended Renderer 512. XDUML is a preferred embodiment of code to use for the metadata language.

Based upon the created render trees, the Browser Renderer 510 and the Extended Renderer 512 will use the Browser Widgets 518 and Extended Widgets 520, respectively, to create the display in the user interface. Both the Browser Widgets 518 and Extended Widgets 520 along with the Browser Event Handler 516 communicate with the Device GUI Toolkit 536 via the Application Windows Toolkit 526, for example. Application Windows Toolkit 526 is the programming interface to draw the images in the view, where as the Device GUI Toolkit is the low level code that does the actual drawing on the device. The Application Windows Toolkit 526 would be enhanced by the Extended AWT (Application Windows Toolkit) 528 so that it would be able to support the events from the Extended Event Handler 514.

The Extended Parser 504, Browser Parser 506 and Request Router 508 utilize the Web Interface Services 522 and File Services 530, which in turn communicate through native device APIs with Device OS 532 and Networking Services 534.

Figure 6:
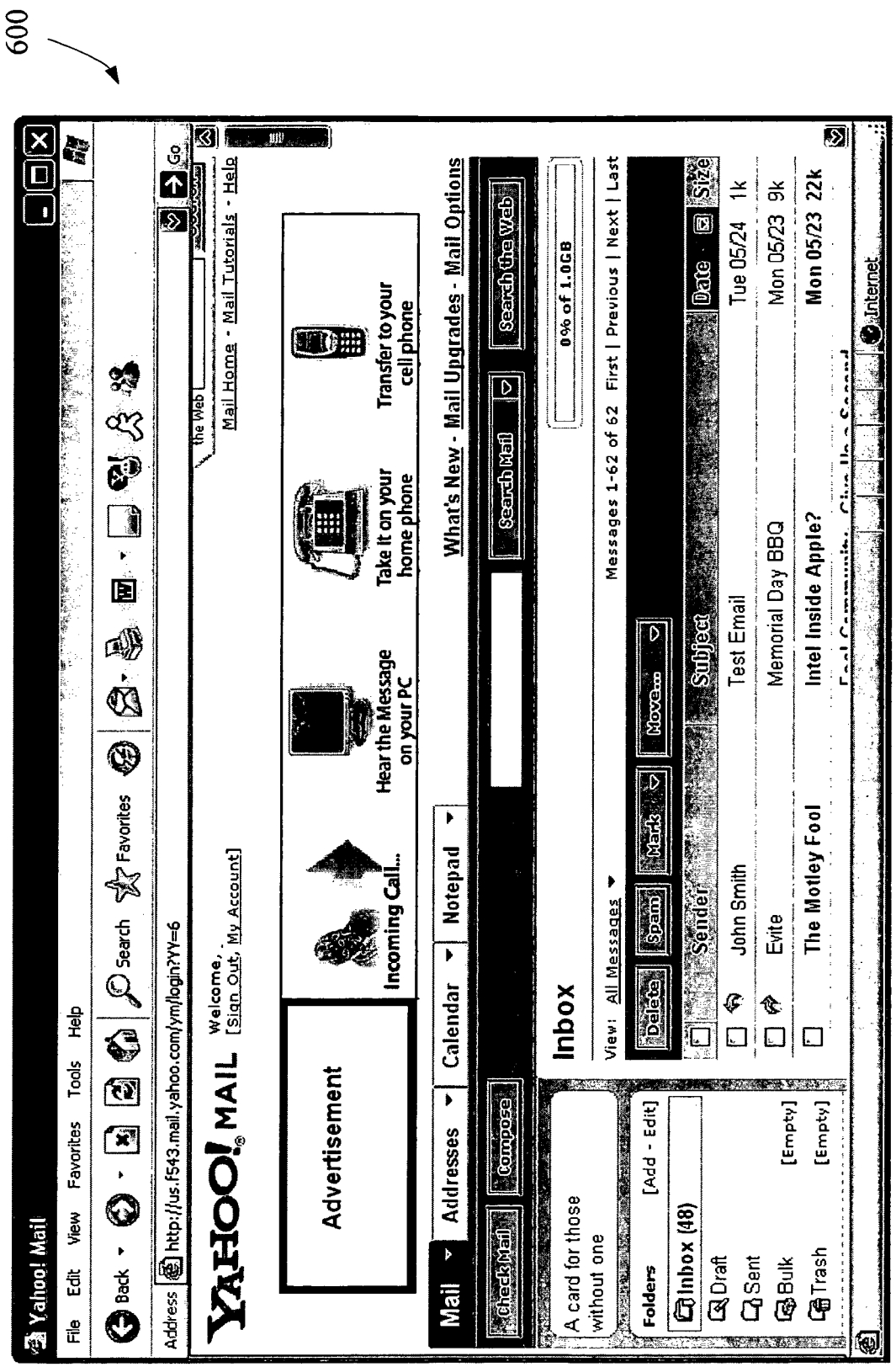
FIG. 6 is an illustration of a typical user interface for a web mail application known in the art.

Referring now to FIG. 6, an example of a user interface 600 for a web-based e-mail application known in the art is illustrated. This application interface is designed for display on a computer monitor or other large display, with the features and functions arranged according to an HTML or similar code, e.g., specifying particular placement of the elements into table cells or rows distributed across the screen. Using existing technology in the art, such web-based applications and other web sites or pages are not effectively displayed on a mobile device having a relatively small display and utilizing a standard web browser. Using the systems and methods of the present invention, however, such a web page interface can be modified or customized using customization code and extended browser components on a client device having an improved architecture, such as device 12 or 500 as described above.

For example, FIGS. 7A and 7B illustrate a customized e-mail application interface 700 according to an embodiment of the present invention. In this example, the web-based e-mail application of FIG. 6 is customized to present a rich, full-featured application customized to fit within the limited display screen of a mobile device 12, 500 such as a cell phone. In one embodiment, this user interface 700 would be the result of extracting and manipulating, in accordance with customization code from server 50, information and other data obtained from a web based email application hosted on one or more servers 70. The customization code includes instructions for tailoring the particular web mail application to optimize functionality on a specific client device 12 or class of client devices. An example of a portion of sample customization code that may be used for such purpose is provided and described in more detail in the section entitled "Example".

Referring to FIG. 7A, an exemplary customized web mail interface 700 can employ a number of pre-defined widgets to optimize display and functionality of retrieved e-mail information. For example, a section 702 can be a typical top header on a cell phone, and can include for example familiar icons depicting information such as signal strength, battery life, new message indicator, and the like.

Section 704 can be defined by a widget for displaying a number of e-mail messages in a widget 710 shown as well as a total number of messages in one or more particular folders. A field 708 can be used to enter a desired message number, e.g., to jump forward to display that message or to begin the displayed list 710 with that message. Navigation through messages can be performed, for example, by pressing specific keys or navigation keys, or by a scroll wheel or other user input devices, as described in more detail in the Example section.

Section 706 is an example of column header extended widgets 520 for identifying the e-mail information shown in section 710. In this case, "Date" and "Sender" are the column headers, and the e-mails of section 710 can be sorted by date or by sender, for example by highlighting and selecting the column header using device input features such as a scroll wheel, space bar, tab key, arrow key, etc.

Section 710 is another example of an extended widget 520. It contains the list of the emails 710-1, 710-2, 710-3 ... 710-8 that are in the currently selected mailbox (e.g., "Inbox" 714). The user can access each email directly by pressing the corresponding number, e.g., "1" for 710-1, "2" for 710-2, etc. on the keypad of the client device 12. Alternatively, the user can use scroll wheels, directional keys, etc on the device to move a cursor or selection box, and highlight the email they wish to see. Messages that not yet been opened or read can be designated, for example, using bold or colored font compared to those messages that have been read.

In one embodiment, as the user navigates from one email to the other, a small semi-transparent box 720 (FIG. 7B) appears on top or bottom of the selected email. Such box 720 includes, for example, a preview of the contents of the email. Such preview information can include any desired level of detail, e.g. the subject, the first one, two or more lines from the e-mail, etc. Such underlying information can be automatically acquired from the web mail server by client for each e-mail listed in 710, for example by logic engine 32 or other components, and stored in client 12 until called for display. To view the whole email, a user can press a key, e.g., the Ok key, Select key, or any other key or device designated by the customization code. The user may also browse the other emails in their mailbox, for example, by pressing the directional keys on the key pad as shown in field 704. This action cube defined to navigate to the next 8 or X number of emails to display in the view.

Section 712 is another example of an extended widget 520 that would support advertisements. In one embodiment, this widget would appear as a pop-up box for a defined period of time. e.g., 2 seconds, 3 seconds or more, when the user first navigates to this page.

Sections 716 and 714 are yet additional examples of extended widgets 520. The Compose 716 and Inbox 714 menus can be mapped to the left and right soft keys, respectively, on the handset of device 12 as described in the "Example" herein. The customization code can include any number of widgets or features to optimize display and functionality of the content retrieved from the web server 70 on the client device 12.

Additional details regarding the widgets and features employed in the embodiment shown in FIGS. 7A and 7B are described in conjunction with the "Examples" section below.

Figure 8:
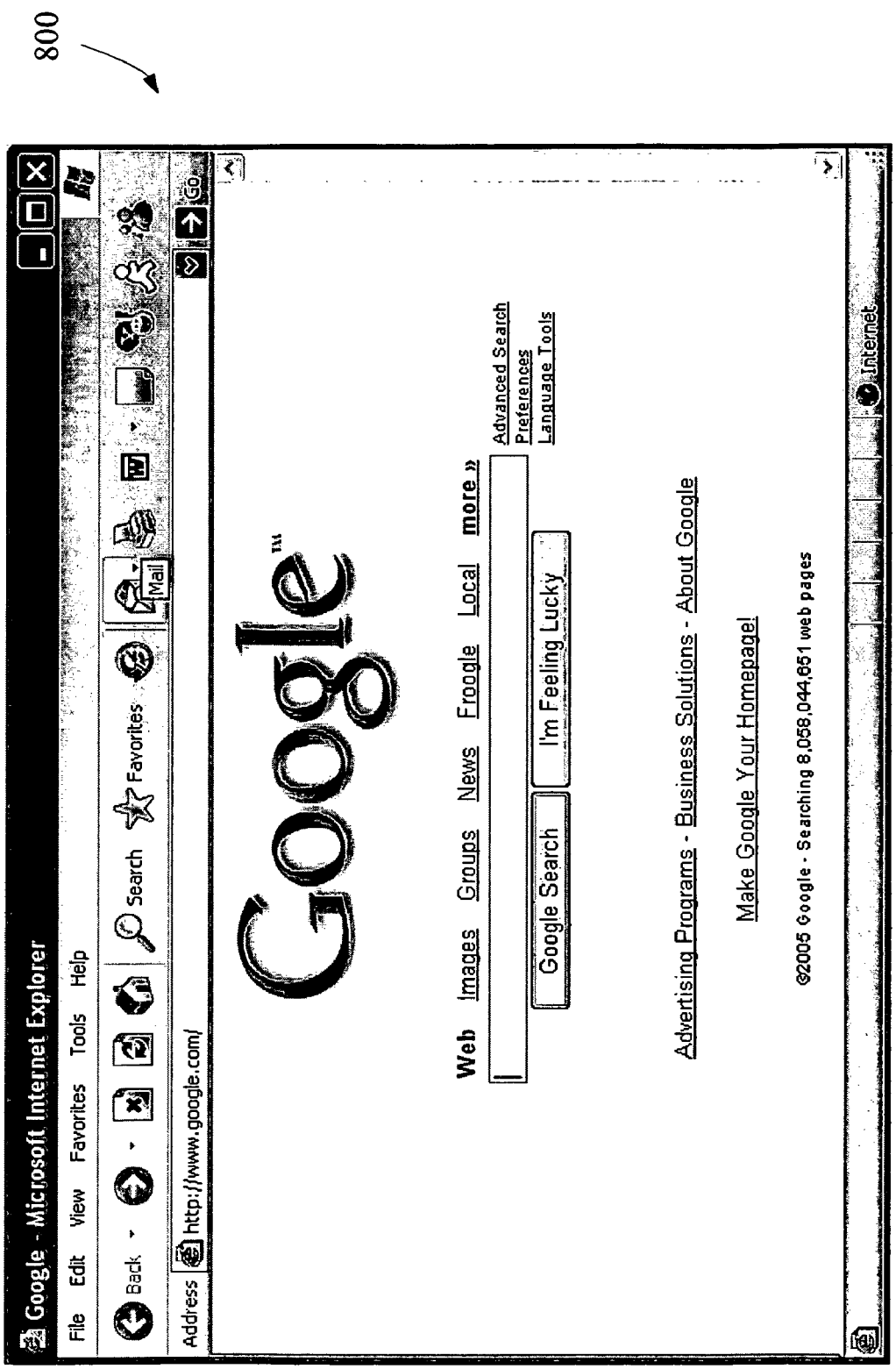
FIG. 8 is an illustration of a typical search engine web page according to the prior art.

Referring now to FIG. 8, an example of another web-based application known in the art, e.g. a web search page (e.g., GOOGLE™), is shown. Like the YAHOO!® web mail application, this application interface is designed for display on a computer monitor or other large display, with the features and functions arranged according to an HTML or similar code, and specifying particular placement of the elements into table cells or rows distributed across the screen. Attempting to display and interact with such a web page on a mobile device with a limited viewing area is awkward. Using the systems and methods of the present invention, however, such a web page application interface can also be customized, e.g., using similar customization code and extended browser components as described above with respect to the webmail application.

FIGS. 9A, 9B, 10A and 10B illustrate an embodiment of customized web search interface pages 900, 1000 according to the present invention. Interface page 900 of FIGS. 9A and 9B, for example, is generated utilizing information returned from an HTTP request to the web site depicted in FIG. 9 (e.g., www.google.com) and modified for display by a mobile device 12, 500, e.g. using instructions within corresponding customization code retrieved from server 50.

A top area 702 of interface page 900 can include status information such as wireless signal strength, notification icons, battery life, and the like as described above with respect to FIG. 7A. Area 904 can be used, for example to identify the web page being accessed, in this case GOOGLE™. A selection box 906, represented by a dashed line, can be used as a cursor to highlight and/or select different elements on the screen. In this example, selection box 906 is highlighting an input field 908, where a user can input text (e.g., keywords) to use for a web search. Area 910 is a table widget including a list of search options 910-1, 910-2, 910-3, 910-4, 910-5, 910-6, 910-7 taken from original page 800, and each of which can be tied to a corresponding key on device. For example 910-1 can be selected by pressing the "1" key, 910-2 by pressing the "2" key, etc.

Area 912 is designated in this example to correspond to the "Google Search" button in FIG. 8, and can be assigned or bound to a soft key or other key on device. For example, after a user enters search terms in area 908, pressing a soft key adjacent to 912 will initiate a request to the GOOGLE™ server (e.g., server 70) to initiate a search using the terms, and to return the results. One should appreciate that the widgets and functions described in this example, as well as the corresponding key designations and other features are for illustrative purposes only, and various modifications may be made without departing from the scope of the invention.

Figures 9A, 9B:
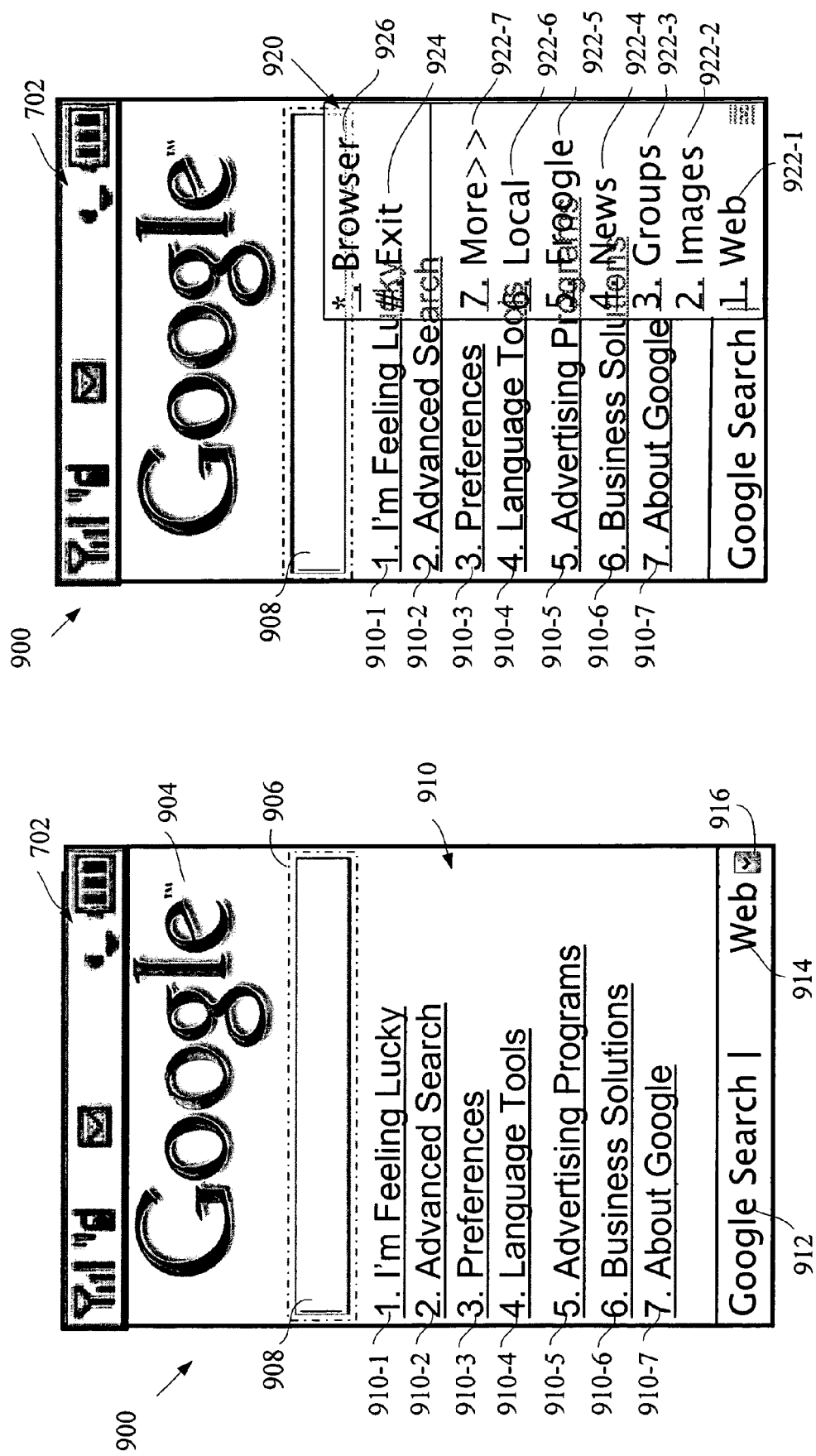
FIG. 9A and 9B are illustrations of an improved user interface for displaying the search engine website of FIG. 8 on a mobile client according to an embodiment of the present invention.

Area 916 can be, for example, a menu widget that can be tied to a corresponding soft key or other input, and allows the user to select between various features of website 800. For example, in FIG. 9A, the current item or feature 914 is "Web". Turning to FIG. 9B, pressing the corresponding soft key causes a menu box 920 to appear on the display. Menu box 920 includes a number of selectable items, including actions such as Browser 926 and Exit 924, as well as sub-search areas or other application features, including Web 922-1, Images 922-2, Groups 922-3, News 922-4, Froogle 922-5, Local 922-6 and More 922-7. Any one of these menu items can be selected, for example, by pressing a corresponding key on the user input device 16 of client 12.

Referring now to FIGS. 10A and 10B, a page 1000 for displaying and interacting with search results entered in page 900 is shown. Area 1004 includes the page title or description. Area 1006 can include the search terms entered into field 908 of FIG. 9A, and area 1016 can include a list of search results, e.g. 1016-0, 1016-1, 1016-2, 1016-3, 1016-4, 1016-5, 1016-6, 1016-7, 1016-8, 1016-9. As described previously, each item in list 1016 can be linked to a key on device 12. Area 1008 includes an identification of the number of search results returned, and which results are presently displayed on page 1000. Arrows 1010 and 1012 can be tied to arrow keys on device 12 to provide navigation to additional search results. A field 1014 can be used, for example, to jump to a particular message.

As shown in FIG. 10A, scrolling over or otherwise selecting an item on list 1016 can open a preview box 1018 including information regarding the selected or highlighted item. For example, box 1018 can include a URL of the result and/or some text or other information regarding the item.

Referring to FIG. 10B, result items in list 1016 can include highlights, coloring, or other features to indicate, for example, a sponsored link (e.g. 1060-0) or a link that has already been visited by the client 12. Search widget 1020 can be selected using a corresponding soft key. Pressing the soft key can display a list of selectable items or features, for example Search 1020-1, Advanced Search 1020-2, and Preferences 1020-3. Such features may be the same as corresponding features on the regular website 800 and initiate the same request to server 70, or any such features may be customized to the particular new application or client 12.

EXAMPLE

The following sample customization code provides an example illustrating some of the concepts and instructions that can be included in resource files from Server 50. In this particular example, the sample code is used for generating an exemplary web-mail application on a mobile device, e.g., such as application 700 as shown and described above with respect to FIGS. 7A and 7B. This example is illustrative only, and is by no means intended to limit the scope of the present invention. Such code can be contained, for example, in one or more documents or files sent from server 50 to client 12, or a component within client 12 such as logic engine 38. For example, in one embodiment, widget layout instructions may be included in a separate file from the mailbox or event handler instructions.

```xml
<?xml version="1.0" encoding="utf-8" ?>
<XDUML version="1.0" application="email-yahoo" device="samsung 8100"
url="http://mail.yahoo.com">
<WIDGETLAYOUT template="email">
    <PAGE id="logon_page">
        <WIDGETS>
            <DROPDOWN id="name" type="edit" text="Logon Id" location="10,40" size="60,10" />
            <DROPDOWN id="password" type="edit_password" text="Logon Password" location="40,40" size="60,10" />
            <BUTTON id="logon" type="push" text="Logon" location="70,40" size="50,10" />
        </WIDGETS>
        <KEYBINDINGS>
            <KEY_NAV_UP>name</KEY_NAV_UP>
            <KEY_NAV_DOWN>password</KEY_NAV_DOWN>
            <KEY_NAV_OK>logon</KEY_NAV_OK>
        </KEYBINDINGS>
    </PAGE>
    <PAGE id="mailbox">
        <WIDGETS>
            <TABLE id="emails" type="email_mailbox" column="2" location="0,10" size="max">
                <PAGELIST id="pagelist" font="default" location="0,0" size="max,10"/>
                <HEADER id="column_header" font="default" location="0,10" size="max,10">
                    <COLUMN id="date" type="sorted" data="normal">Date</COLUMN>
                    <COLUMN id="subject" type="sorted" data="preview">Subject</COLUMN>
                </HEADER>
                <BODY>
                    <ROW id="row_1" type="preview" font="default" location="default" size="default">
                        <RCOLUMN id="cell_11" name="Date"/>
                        <RCOLUMN id="cell_12" name="Sender"/>
                    </ROW>
                    <ROW id="row_2" type="preview" font="default" location="default" size="default">
                        <RCOLUMN id="cell_21" name="Date"/>
                        <RCOLUMN id="cell_22" name="Sender"/>
                    </ROW>
                    <ROW id="row_3" type="preview" font="default" location="default" size="default">
                        <RCOLUMN id="cell_31" name="Date"/>
                        <RCOLUMN id="cell_32" name="Sender"/>
                    </ROW>
                </BODY>
            </TABLE>
            <MESSAGEBOX id="ad" type="popup" location="25,60" size="50,30" lifespan="5" />
            <MENU id="action" type="softkey" location="0,90" size="40,10" />
            <MENU id="folders" type="softkey" location="40,90" size="40,10" />
        </WIDGETS>
        <KEYBINDINGS>
```

-continued

```
            <KEY_1>row_1</KEY_1>
            <KEY_2>row_2</KEY_2>
            <KEY_3>row_3</KEY_3>
            <KEY_NAV_LEFT>pagelist</KEY_NAV_LEFT>
            <KEY_NAV_RIGHT>pagelist</KEY_NAV_RIGHT>
            <KEY_SOFT_LEFT>action</KEY_SOFT_LEFT>
            <KEY_SOFT_RIGHT>folders</KEY_SOFT_RIGHT>
            <KEY_POUND>script_spam</KEY_POUND>
            <KEY_0>script_move</KEY_0>
            <KEY_STAR>script_delete</KEY_STAR>
        </KEYBINDINGS>
    </PAGE>
</WIDGETLAYOUT>
<CONTENTMAPPING>
    <MAPPING type="text" src="c:\usernames.cache" dst="name.values" />
    <MAPPING type="text" src="c:\password.cache" dst="password.values" />
    <MAPPING type="text" src="[xpath to the text]" dst="pagelist.value" />
    <MAPPING type="table" src="[xpath to table]" dst="emails">
        <COLUMNMAP src="[relative xpath to date column]" dst="date.values" />
        <COLUMNMAP src="[relative xpath to subject column]" dst="subject.values" />
        <COLUMNMAP src="[relative xpath to subject column]/[relative xpath to email data]" dst="sender.preview" />
    </MAPPING>
</CONTENTMAPPING>
<EVENTHANDLER>
    <EVENT control="logon" type="on_click" script="javascript">
        <!--
            var submitString;
            submitString = somestring + username.value + password.value;
            HTTPObject.Submit (submitString);
            PageObject.Init ("mailbox");
        -->
    </EVENT>
</EVENTHANDLER>
</XDUML>
```

Several of the sample instructions provided in the above example will now be described in more detail.

Headers

```
<XDUML version="1.0" application="email-yahoo" device="samsung 8100" url="http://mail.yahoo.com">
```

Headers or similar instructions such as the above statement can be used to identify or declare the type of code that follows. In this example, the above instruction includes a declaration where:
  version identifies the XDUML version
  application defines the application for this XDUML file
  device identifies the applicable devices
  url can identify the url containing the primary web page(s) that the application will customize In one embodiment, all XDUML file include a declaration that may be similar to the above for identifying the customization code.

Widget Layout
  <WIDGETLAYOUT template="email">

After the declaration, a first main component of the Example is a WIDGETLAYOUT instruction set, beginning with the above line, where:
  The template command identifies the widget layout template. In this example, the template is for an email application that displays and provides for interaction with e-mail messages from a web-mail client, e.g., YAHOO!® Mail.

Logon Page
  The Widget Layout instruction set defines different pages and corresponding widgets to be employed within the application template defined by <WIDGETLAYOUT template="email">. The first page identified and described in the WIDGETLAYOUT instruction set is the Logon Page, identified by:
  <PAGE id="logon_page ">
  The PAGE id instruction declares a page to display, where:
  id identifies the unique id of this page.

In this case, the unique id relates to the logon page of the specified web-mail client. The next PAGE id instruction, described later, provides instructions for the mailbox page that is shown after logon is completed.

```
<WIDGETS>
    <DROPDOWN id="name" type="edit" text="Logon Id" location="10,40" size="60,10" />
    <DROPDOWN id="password" type="edit_password" text ="Logon Password" location="40,40" size="60,10" />
    <BUTTON id="logon" type="push" text="Logon" location="70,40" size="50,10" />
</WIDGETS>
```

The above portion of the logon page code, initiated by <WIDGETS> and closed by </WIDGETS>, declares the widgets to display for this page, where:
  DROPDOWN designates a drop down combo box widget type.
  BUTTON designates a button widget.
  type specifies a more refined type for the widget.
  text specifies the text to display.
  location specifies a location on the device display to place the widget on the page.
  size specifies the size of the widget.

```
<KEYBINDINGS>
    <KEY_NAV_UP>name</KEY_NAV_UP>
    <KEY_NAV_DOWN>password</KEY_NAV_DOWN>
    <KEY_NAV_OK>logon</KEY_NAV_OK>
</KEYBINDINGS>
```

The <KEYBINDINGS> section of the logon page code declares the bindings between the key and the widgets on the page, where:

KEY_NAV_UP the up navigation key binds to the name DROPDOWN widget on this page.

KEY_NAV_DOWN the up navigation key binds to the password DROPDOWN widget on this page.

KEY_NAV_OK the up navigation key binds to the name BUTTON widget on this page.

Mailbox Page

After logon is completed, the next page displayed by the customized application is the Mailbox Page, details for which are initiated within the <WIDGETLAYOUT> component by the instruction <PAGE id="mailbox">. This command, and those that follow it, are similar to the corresponding commands described above for the logon page. The <WIDGETS> and <KEYBINDINGS> section provides detailed instructions for the layout of the mailbox page, including how the information from incoming e-mails are to be distributed on a display and how the device interface features are used to interact with the e-mail data. Such instructions can be used, for example, to create application interface 700 as shown in FIGS. 7A and 7B.

In this example, a <TABLE> widget is used to define the layout of the application features, including distribution of the elements into rows and columns. For example, the following types of commands can be used to identify columns to be place in the header:

```
<COLUMN id="date" type="sorted"
    data="normal">Date</COLUNN>
<COLUMN id="subject" type="sorted"
    data="preview">Subject</COLUMN>
```

Similarly, row designations can be used to specify rows and corresponding columns containing e-mail information for the e-mail inbox page, for example:

```
<ROW id="row_1" type="preview" font="default"
    location="default" size="default">
        <RCOLUMN id="cell_11" name="Date"/>
        <RCOLUMN id="cell_12" name="Subject"/>
</ROW>
```

The row identified as row_1 includes two cells, cell_11 and cell_12, corresponding to the columns identified above and include date and sender information, respectively, for the e-mail listed in that row. See, for example, row 710-1 of FIG. 7A. The sample code specifies three rows, identified as row_1, row_2 and row_3, but of course any number of rows and columns can be specified as desired to optimize layout of information on the interface.

Of course, various other widgets, components and/or features can be incorporated and coded as desired. For example, a pop-up box widget such as that advertisement box 712 in FIG. 7A can be described in the customization code as follows:

```
<MESSAGEBOX id="ad" type="popup" location="25,60"
    size="50,30" lifespan="5" />, where:
```

MESSAGEBOX designates a message box type of widget.

type designates a particular type of message box widget, in this case a popup box.

location, size and lifespan define particular placement and other characteristics of the popup box.

Also, one or more MENU widgets or the like can also be used to specify a menu with selectable functions, for example menus 714 and 716 in FIGS. 7A and 7B. Code for a menu widget, as shown in the sample code, can include further definition for the type of menu widget such as softkey, e.g., a for a selectable or pull down menu tied to a softkey on the device (e.g., a mobile telephone phone):

```
<MENU id="action" type="softkey" location="0,90" size="40,10"
/>
<MENU id="folders" type="softkey" location="40,90" size="40,10"
/>
```

In this example, the "action" menu can designate a menu such as 716 in FIGS. 7A and 7B, where menu items such as "Compose", "Check Mail", "Search Mail", and the like can be selected and implemented, e.g., by pressing the corresponding key(s) bound to the menu in the KEYBINDINGS section described in more detail below. Similarly, the "folders" menu can include sub-folders within the Inbox, and/or it could include other folders such as "Draft", "Sent", "Bulk", "Trash", or the like as are known in the art and shown in FIG. 6.

```
<KEYBINDINGS>
    <KEY_1>row_1</KEY_1>
    <KEY_2>row_2</KEY_2>
    <KEY_3>row_3</KEY_3>
    <KEY_NAV_LEFT>pagelist</KEY_NAV_LEFT>
    <KEY_NAV_RIGHT>pagelist</KEY_NAV_RIGHT>
    <KEY_SOFT_LEFT>action</KEY_SOFT_LEFT>
    <KEY_SOFT_RIGHT>folders</KEY_SOFT_RIGHT>
    <KEY_POUND>script_spam</KEY_POUND>
    <KEY_0>script_move</KEY_0>
    <KEY_STAR>script_delete</KEY_STAR>
</KEYBINDINGS>
```

The above <KEYBINDINGS> section of the mailbox page has a similar function to that described for the logon page, and provides details for associating specific hard and/or soft keys on the client device 12 to elements on the page, such as elements defined by the various id=" " tags in the code. For example, KEY_1 is associated with row_1 such that, when a user presses the "1" key on the mobile phone or other client device, the e-mail listed in the first row (e.g., 710-1 in FIGS. 7A and 7B) is selected. Such selection can then invoke an HTTP or other request to retrieve the corresponding e-mail. In some embodiments, the client has already retrieved the associated message, e.g., as dependent data when the mailbox page was retrieved and rendered. Thus, such messages can be stored in memory 20 of the client device 12 waiting for the user to scroll over or select the corresponding e-mail listing.

Other keys can be bound to different elements or functions, such as the left and right soft keys being bound to the action and folders menus as shown in the sample code and described above with respect to FIGS. 7A and 7B. Still other keys can be bound to invoke scripts, for example the "#" key in the sample code and in 720-2 of FIG. 7B invokes a script_spam, which, for example, can designate the selected e-mail as "SPAM" and block future messages from the sender. The "0" key can be tied to script_move, e.g., shown as "0 Move" 720-3, such that selecting "0" moves the message into another folder in menu 714. Pressing the star (*) key on the interface 16 in this example runs script_delete, e.g. shown as "* Delete" 720-1, such that pressing the star key deletes the selected message.

One skilled in the art will appreciate that various other widgets, features scripts, and the like may be bound or linked to any desired input keys, soft keys, scroll wheels, or other user input devices of interface 16.

Content Mapping

```
<CONTENTMAPPING>
    <MAPPING type="text" src="c:\usernames.cache"
dst="name.values" />
    <MAPPING type="text" src="c:\password.cache"
dst="password.values" />
    <MAPPING type="text" src="[xpath to the text]"
dst="pagelist.value" />
    <MAPPING type="table" src="[xpath to table]"
dst="emails">
        <COLUMNMAP src="[relative xpath to date column]"
dst="date.values" />
        <COLUMNMAP src="[relative xpath to subject
column]" dst="subject.values" />
        <COLUMNMAP src="[relative xpath to subject
column]/[relative xpath to email data]" dst="sender.preview" />
    </MAPPING>
</CONTENTMAPPING>
```

The <CONTENTMAPPING> section of the sample code describes, for example, how to map the web application (e.g., YAHOO!® Mail) into the customized application for the client, where:

MAPPING specifies a mapping.

type tells what type of mapping to make.

text means that it just takes the text value from the source as is and makes no changes.

table specifies that this is a table mapping and will map the web page table to the application's table widget. When the type is table, the system may require further XML text to specify the column mapping, for example using the COLUMNMAP XML tag.

src specifies the source of the data, which can be from a local cache or a XPATH to the web page, for example. The XPATH can be a complete path or a relative path.

dst specifies the destination widget to place the data.

By default, each widget can have a Values property that is set by such default mapping. The code can specify the desired property of the widget to be set, for example by using a "." (period) specification. For example, the command sender.preview sets the preview property of the sender widget.

Event Handler

```
<EVENTHANDLER>
    <EVENT control="logon" type="on_click"
script="javascript">
        <!--
```

-continued

```
        var submitString;
        submitString = somestring + username.value +
password.value;
        HTTPObject.Submit (submitString);
        PageObject.Init ("mailbox");
        -->
    </EVENT>
</EVENTHANDLER>
```

The above example of the EVENTHANDLER portion of the sample code contains instructions to handle events. In this example, a script is used to handle the on_click event for the logon widget. The script can be written, for example Javascript or other appropriate languages, and can be used for example to create the logon string and submit it to the website.

The present invention can be implemented as a computer program product that comprises a computer program mechanism embedded in a computer readable storage medium. For instance, the computer program product could contain the program modules shown in FIG. 1, FIG. 4 and/or FIG. 5. These program modules can be stored on a CD-ROM, DVD, magnetic disk storage product, or any other computer readable data or program storage product. The software modules in the computer program product can also be distributed electronically, via the Internet or otherwise, by transmission of a computer data signal (in which the software modules are embedded) either digitally or on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A method for generating a customized web application on a client device, the method comprising:
   (a) receiving on a client device, through a user interface of the client device, a command to access a website hosted on a first server;
   (b) after receiving the command, sending a first request to access the website from the client device to a second server, the second server comprising a memory storing customization code, wherein said customization code includes one or more instructions for customizing one or more features of the website for use on the client device and wherein the customization code comprises (i) instructions for identifying which of a plurality of widgets that are stored on the client device are to be used in the one or more instructions for customizing one or more features of the website, (ii) instructions for laying out the widgets on the user interface of the client device, and (iii) instructions for requesting website content from the website and mapping the website content received from the website onto the user interface of the client device;
   (c) after sending the first request, receiving the customization code, on the client device, from the second server;
   (d) after receiving the customization code, sending a second request directly to the first server, from the client device, for the website content, without using the second server to make the second request, the second request being specified by the customization code;
   (e) after sending the second request, receiving the website content directly on the client device without using the second server;

(f) customizing the website content on the client device in accordance with the one or more instructions in the customization code, thereby constructing said customized web application on the client device, wherein the customizing step (f) comprises (i) incorporating the widgets in the plurality of widgets, which are identified by the customization code, into the customized web application, (ii) laying out the identified widgets on the user interface of the client device as specified in the customization code and (iii) mapping the website content received from the website onto the user interface of the client device as specified in the customization code; and (g) operating said customized web application through the user interface of the client device.

2. The method of claim 1, wherein the client device is a mobile device.

3. The method of claim 1, wherein the client device is a cellular telephone.

4. The method of claim 1, wherein the first request comprises a uniform resource locator that designates the website.

5. The method of claim 1, wherein the website content comprises hypertext markup language.

6. The method of claim 1, wherein the website content comprises information corresponding to a plurality of e-mails.

7. The method of claim 1, wherein the website content comprises a web search application.

8. The method of claim 1, wherein the one or more instructions for customizing one or more features of the website further comprises one or more event handler instructions, and/or one or more context data instructions.

9. The method of claim 1, wherein the client device is a computer comprising a display having a display size, and operating said customized web application comprises formatting the website content to fit within a window of the display, said window having a window size.

10. The method of claim 9, wherein the window size is less than about fifty percent of the display size.

11. A computer system for generating a customized web application on a client device, the computer system comprising:

a client device comprising a central processing unit, a user interface and a memory coupled to the central processing unit, the memory storing a logic engine; and a first server in communication with said client device, said first server comprising a server central processing unit and a server memory, the server memory coupled to the server central processing unit and storing one or more instructions for operating a customized web application through the user interface of the client device, said customized web application including website content from a website hosted on a second server, wherein the computer system executes the method of claim 1.

12. The method of claim 1, wherein the instructions for requesting website content from the website comprise requesting multiple web pages from the website so that contents from the multiple web pages are mapped onto the user interface of the client device.

13. The method of claim 1, wherein the customization code further comprises (iv) instructions for requesting additional web pages from another website and mapping contents from the additional web pages received from the another website onto the user interface of the client device.

14. A computer program product for use in conjunction with a computer system, the computer program product comprising a computer readable storage medium and a computer program mechanism embedded therein, the computer program mechanism comprising:

(a) instructions for receiving on a client device, through a user interface on the client device, a command to access a website hosted on a first server;

(b) instructions for, after receiving the command, sending a first request to access the website from the client device to a second server in response to the command, the second server comprising a memory storing customization code, wherein said customization code includes one or more instructions for customizing one or more features of the website for use on the client device and wherein the customization code comprises (i) instructions for identifying which of a plurality of widgets that are stored on the client device are to be used in the one or more instructions for customizing one or more features of the website, (ii) instructions for laying out the widgets on the user interface of the client device, and (iii) instructions for requesting website content from the website and mapping the website content received from the website onto the user interface of the client device;

(c) instructions for, after sending the first request, receiving the customization code, on the client device, from the second server (d) instructions for, after receiving the customization code, sending a second request directly to the first server, from the client device, for the website content, without using the second server to make the second request, the second request being specified by the customization code;

(e) instructions for, after sending the second request, receiving the website content directly on the client device without using the second server;

(f) instructions for customizing the website content on the client device in accordance with the one or more instructions in the customization code, thereby constructing a customized web application on the client device, wherein the instructions for customizing (f) comprise (i) instructions for incorporating the widgets in the plurality of widgets, which are identified by the customization code, into the customized web application, (ii) instructions for laying out the identified widgets on the user interface of the client device as specified in the customization code and (iii) instructions for mapping the website content received from the website onto the user interface of the client device as specified in the customization code; and (g) instructions for operating said customized web application through the user interface of the client device.

15. The computer program product of claim 14, wherein the one or more instructions for customizing one or more features of the website comprise one or more event handler instructions and/or one or more context data instructions.

16. The computer program product of claim 14, wherein the client device is a mobile device.

17. The computer program product of claim 14, wherein the instructions for requesting website content from the website comprise requesting multiple web pages from the website so that contents from the multiple web pages are mapped onto the user interface of the client device.

18. The computer program product of claim 14, wherein the customization code further comprises (iv) instructions for requesting additional web pages from another website and mapping contents from the additional web pages received from the another website onto the user interface of the client device.

* * * * *